United States Patent
Lee et al.

(10) Patent No.: US 7,436,860 B2
(45) Date of Patent: Oct. 14, 2008

(54) METHOD OF ADVERTISING DNS SERVER ADDRESS AND ROUTING METHOD THEREBY

(75) Inventors: Hak-goo Lee, Suwon-si (KR);
Young-keun Kim, Incheon (KR);
Sun-woo Kim, Suwon-si (KR);
Sang-hyun Shin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 790 days.

(21) Appl. No.: 10/808,607

(22) Filed: Mar. 25, 2004

(65) Prior Publication Data

US 2004/0246948 A1    Dec. 9, 2004

(30) Foreign Application Priority Data

Jun. 9, 2003    (KR) ...................... 10-2003-0036743

(51) Int. Cl.
*H04J 3/02* (2006.01)
(52) U.S. Cl. ..................................... 370/539
(58) Field of Classification Search ................. 370/539, 370/541, 351, 352, 353, 354, 355, 389, 399, 370/400, 401, 474, 506, 527, 528, 529; 709/241–249, 709/238
See application file for complete search history.

(56) References Cited

U.S. PATENT DOCUMENTS

| | | | | |
|---|---|---|---|---|
| 6,977,937 | B1 * | 12/2005 | Weinstein et al. | 370/401 |
| 7,161,897 | B1 * | 1/2007 | Davies et al. | 370/217 |
| 7,245,640 | B2 * | 7/2007 | Kwiatkowski | 370/528 |

* cited by examiner

*Primary Examiner*—Chi H. Pham
*Assistant Examiner*—Alexander Boakye
(74) *Attorney, Agent, or Firm*—Staas & Halsey LLP

(57) ABSTRACT

A method of advertising an address of a domain name service (DNS) server present, for example, on an IPv6 network by searching a location of the DNS server on a router network subnet using a dynamic routing protocol, storing link state information of the router indicating the DNS server existence in the router subnet, in a link state advertisement of the router, and delivering the link state advertisement to all routers within an autonomous system, to which the router belongs. When the router having the location of the DNS server is requested by another router to provide the DNS server address, the router replies to the requesting router, and the requesting router receiving the reply, advertises a router advertisement message containing the DNS server address to a subnet to which the requesting router belongs. Accordingly, a network can be set without manually setting DNS server addresses at hosts.

18 Claims, 10 Drawing Sheets

FIG. 3
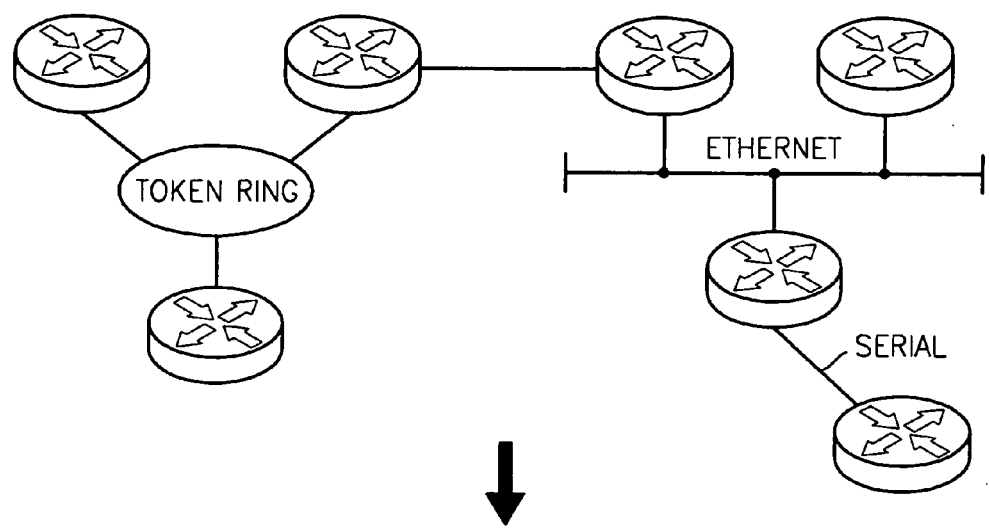
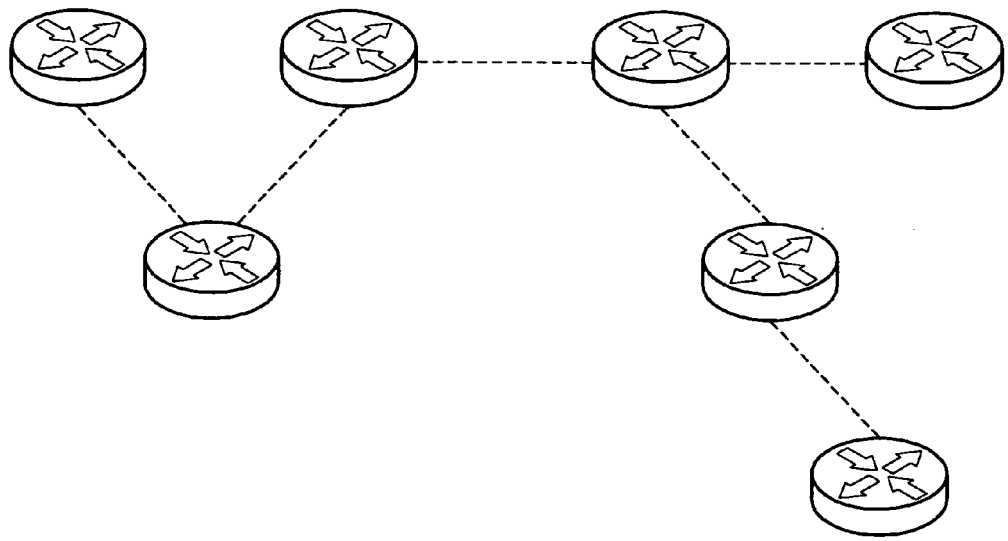

FIG. 9

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          LS age              |0|0|1|            1              |
+-+-+-+-+-+-+-+-+-+-+-+-+-+-+-+-+-+-+-+-+-+-+-+-+-+-+-+-+-+-+-+-+
|                        Link State ID                           |
+-+-+-+-+-+-+-+-+-+-+-+-+-+-+-+-+-+-+-+-+-+-+-+-+-+-+-+-+-+-+-+-+
|                       Advertising Router                       |
+-+-+-+-+-+-+-+-+-+-+-+-+-+-+-+-+-+-+-+-+-+-+-+-+-+-+-+-+-+-+-+-+
|                       LS sequence number                       |
+-+-+-+-+-+-+-+-+-+-+-+-+-+-+-+-+-+-+-+-+-+-+-+-+-+-+-+-+-+-+-+-+
|   910  LS checksum           |              length             |
+-+-+-+-+-+-+-+-+-+-+-+-+-+-+-+-+-+-+-+-+-+-+-+-+-+-+-+-+-+-+-+-+
| 0 (D)|W|V|E|B|              Options                            |
+-+-+-+-+-+-+-+-+-+-+-+-+-+-+-+-+-+-+-+-+-+-+-+-+-+-+-+-+-+-+-+-+
|     Type      |       0       |           Metric               |
+-+-+-+-+-+-+-+-+-+-+-+-+-+-+-+-+-+-+-+-+-+-+-+-+-+-+-+-+-+-+-+-+
|                         Interface ID                           |
+-+-+-+-+-+-+-+-+-+-+-+-+-+-+-+-+-+-+-+-+-+-+-+-+-+-+-+-+-+-+-+-+
|                     Neighbor Interface ID                      |
+-+-+-+-+-+-+-+-+-+-+-+-+-+-+-+-+-+-+-+-+-+-+-+-+-+-+-+-+-+-+-+-+
|                       Neighbor Router ID                       |
+-+-+-+-+-+-+-+-+-+-+-+-+-+-+-+-+-+-+-+-+-+-+-+-+-+-+-+-+-+-+-+-+
|                              ...                               |
+-+-+-+-+-+-+-+-+-+-+-+-+-+-+-+-+-+-+-+-+-+-+-+-+-+-+-+-+-+-+-+-+
|     Type      |       0       |           Metric               |
+-+-+-+-+-+-+-+-+-+-+-+-+-+-+-+-+-+-+-+-+-+-+-+-+-+-+-+-+-+-+-+-+
|                         Interface ID                           |
+-+-+-+-+-+-+-+-+-+-+-+-+-+-+-+-+-+-+-+-+-+-+-+-+-+-+-+-+-+-+-+-+
|                     Neighbor Interface ID                      |
+-+-+-+-+-+-+-+-+-+-+-+-+-+-+-+-+-+-+-+-+-+-+-+-+-+-+-+-+-+-+-+-+
|                       Neighbor Router ID                       |
+-+-+-+-+-+-+-+-+-+-+-+-+-+-+-+-+-+-+-+-+-+-+-+-+-+-+-+-+-+-+-+-+
|                              ...                               |
```

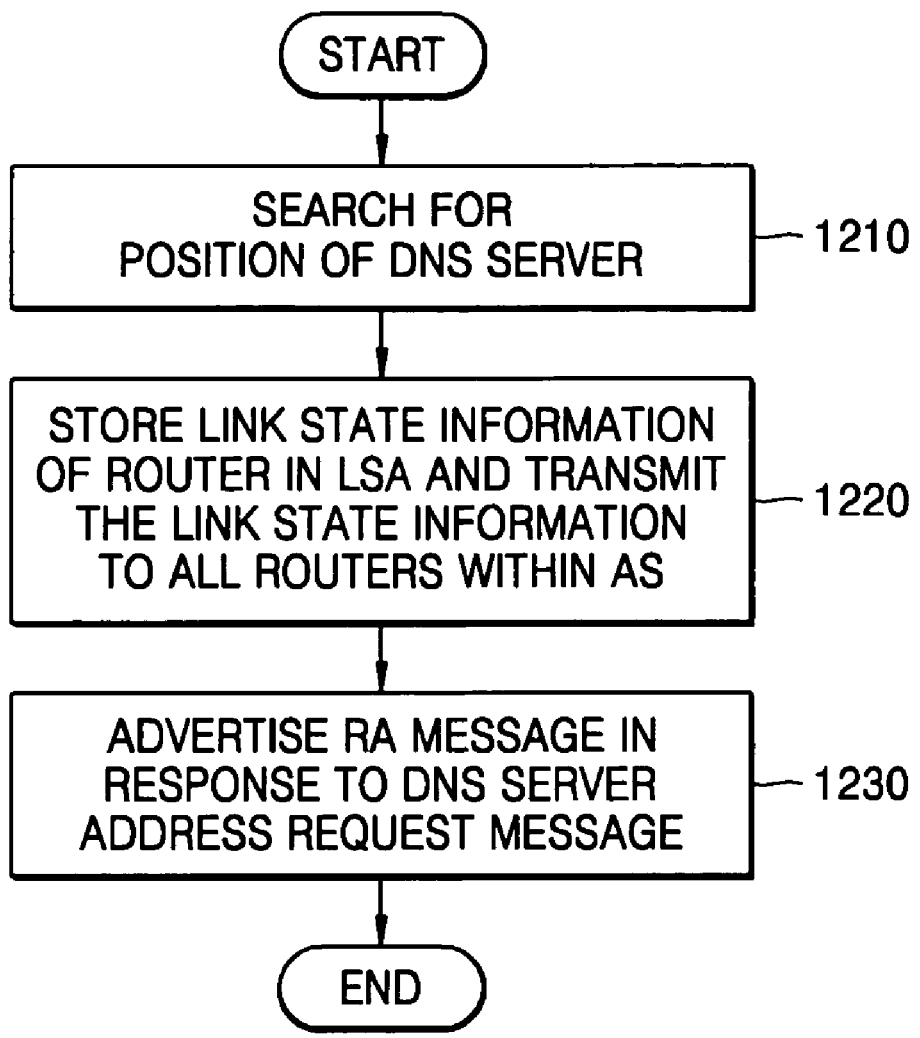

METHOD OF ADVERTISING DNS SERVER ADDRESS AND ROUTING METHOD THEREBY

CROSS-REFERENCE TO RELATED APPLICATIONS

This application claims the priority benefit of Korean Patent Application No. 2003-36743, filed on Jun. 9, 2003, in the Korean Intellectual Property Office, the disclosure of which is incorporated herein in its entirety by reference.

BACKGROUND OF THE INVENTION

1. Field of the Invention

The present invention relates to an IPv6 network, and more particularly, to a method of advertising an address of a domain name service (DNS) server present on an IPv6 network, and a routing method thereby.

2. Description of the Related Art

The Internet is composed of autonomous systems that are operated by a network manager. The network manager may be an Internet service provider (ISP), a school, or a company. The group of autonomous systems forms the Internet in a hierarchical structure. Routing protocols for exchanging routing information between routers within one autonomous system are called interior gateway protocols (IGPs), and routing protocols for exchanging routing information between a plurality of autonomous systems are called exterior gateway protocols (EGPs). Examples of the IGPs include routing information protocols (RIPs) and open shortest path first (OSPF) protocols. An example of the EGPs is border gateway protocols (BGPs).

The OSPF protocols are typical link-state protocols. Routers used in the OSPF protocols exchange topologies and link states of their local links with other routers to form a topology of an overall network. All routers within a routing domain of a pertinent network have the same information on the configured network topology, and perform routing using information on the network topology.

Here, information that describes topologies and link states of local links and the exchange of the topologies and link states with other routers is called a link-state advertisement (LSA). A procedure of continuously forwarding LSAs to other routers is called flooding. Information on the overall network obtained using the forwarded LSAs is referred to as a link state database.

When a network is an IPv6 network, even though a user does not set Internet protocol (IP) addresses, network equipment connected to the IPv6 network can receive a router advertisement (RA) message from routers and automatically set the IP addresses using network prefix information contained in the message. Accordingly, a user interface does not need to be used for setting up a network.

Although the IP addresses are automatically set using the prefix information contained in the RA message, domain name service (DNS) servers are not automatically set and have to be manually set one by one. When one of the set DNS servers is out of order and hence cannot operate, other DNS servers have to be manually set one by one.

SUMMARY OF THE INVENTION

The present invention provides a routing method which can dynamically search for a position of a domain name service (DNS) server connected to the Internet using a predetermined routing protocol, inform the link state information of the DNS server to all routers connected to a network to transmit the position information of the DNS server to predetermined hosts which ask the position of the DNS server, so that an address of the DNS server can be automatically set. The present invention also provides an apparatus and a computer-readable recording medium having thereon a program controlling the apparatus according to the processes of the present invention.

Additional aspects and/or advantages of the invention will be set forth in part in the description which follows and, in part, will be obvious from the description, or may be learned by practice of the invention.

The present invention may be achieved by a routing method comprising searching for a position of a DNS server present on a network using a predetermined dynamic routing protocol; and storing link state information of a router, which has the DNS server in a subnet, in a link state advertisement of the router, and delivering the link state advertisement information to all routers within an autonomous system, to which the router belongs, through a flooding procedure; wherein when the router is requested to provide an address of the DNS server, replying to the requesting router by the router receiving the DNS server address request, and advertising by the router having received the reply a router advertisement message containing the information on the address of the DNS server to a subnet to which the router having received the reply belongs.

The present invention may also be achieved be a method of advertising information on a DNS server, comprising searching for a position of a DNS server present on a network using a predetermined dynamic routing protocol; storing link state information of a router, which has the DNS server in a subnet, in a link state advertisement of the router, and transmitting the link state advertisement information to all routers within an autonomous system, to which the router belongs, through a flooding procedure.

BRIEF DESCRIPTION OF THE DRAWINGS

The above and/or other features and advantages of the present invention will become more apparent by describing in detail exemplary embodiments thereof with reference to the attached drawings in which:

FIG. 3 is a diagram showing that a group of routers interconnected by data links is viewed as a group of nodes interconnected by adjacencies;

FIG. 9 is a diagram of a router link state advertisement message format for informing that a DNS server exists in a subnet of a router, according to an embodiment of the present invention;

FIG. 12 is a flow chart of routing DNS server addresses according to an embodiment of the present invention.

DETAILED DESCRIPTION OF THE PREFERRED EMBODIMENTS

Figure 1A:
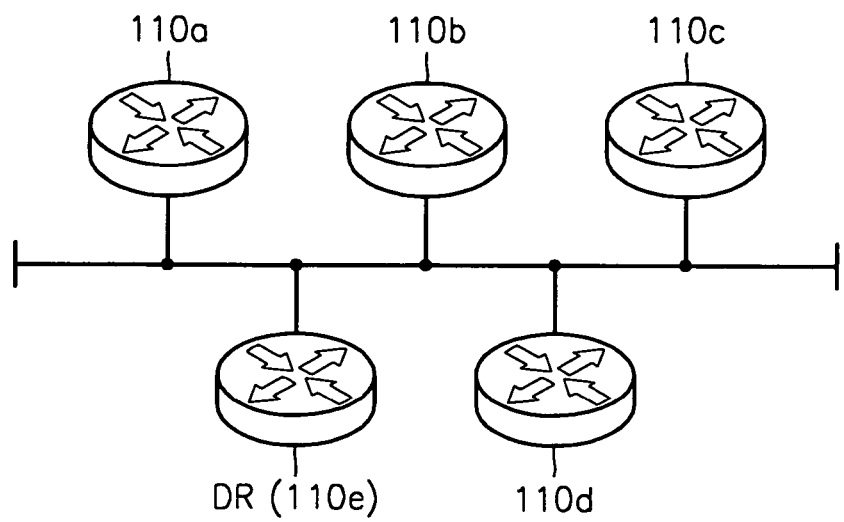
FIGS. 1A and 1B are diagrams illustrating a relationship between a designated router (DR) and other routers connected to a network.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1B:
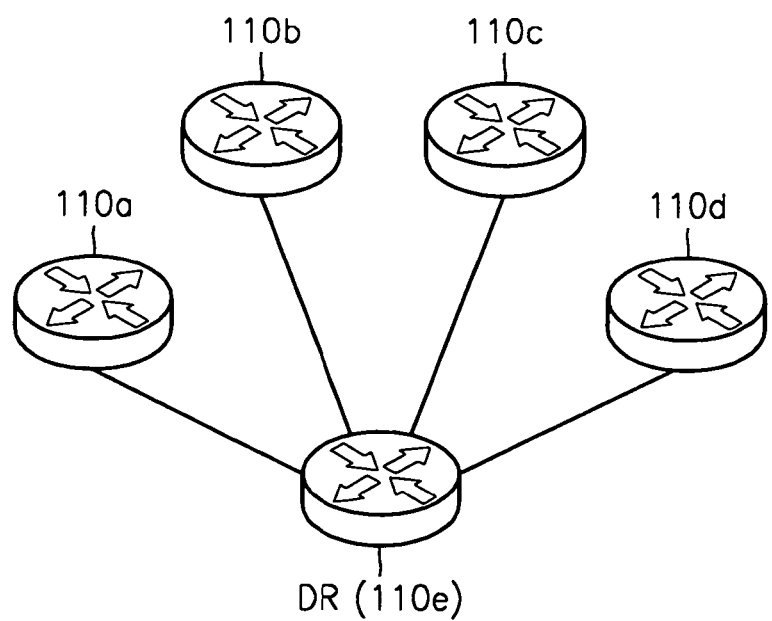

FIGS. 1A and 1B are diagrams illustrating a relationship between a designated router and other routers connected to a network. Referring to FIG. 1A, a plurality of routers 110a through 110e are connected to a network. A designated router (DR) 110e is a router that relays packets to another network. As shown in FIG. 1B, packets are transmitted from the routers 110a through 110d to another network via the DR 110e. Packets received from the other network are transmitted to the routers 110a through 110d via the DR 110e. More particularly, in FIG. 1B, the routers 110a through 110d are connected to one another through the DR 110e.

Figure 2:
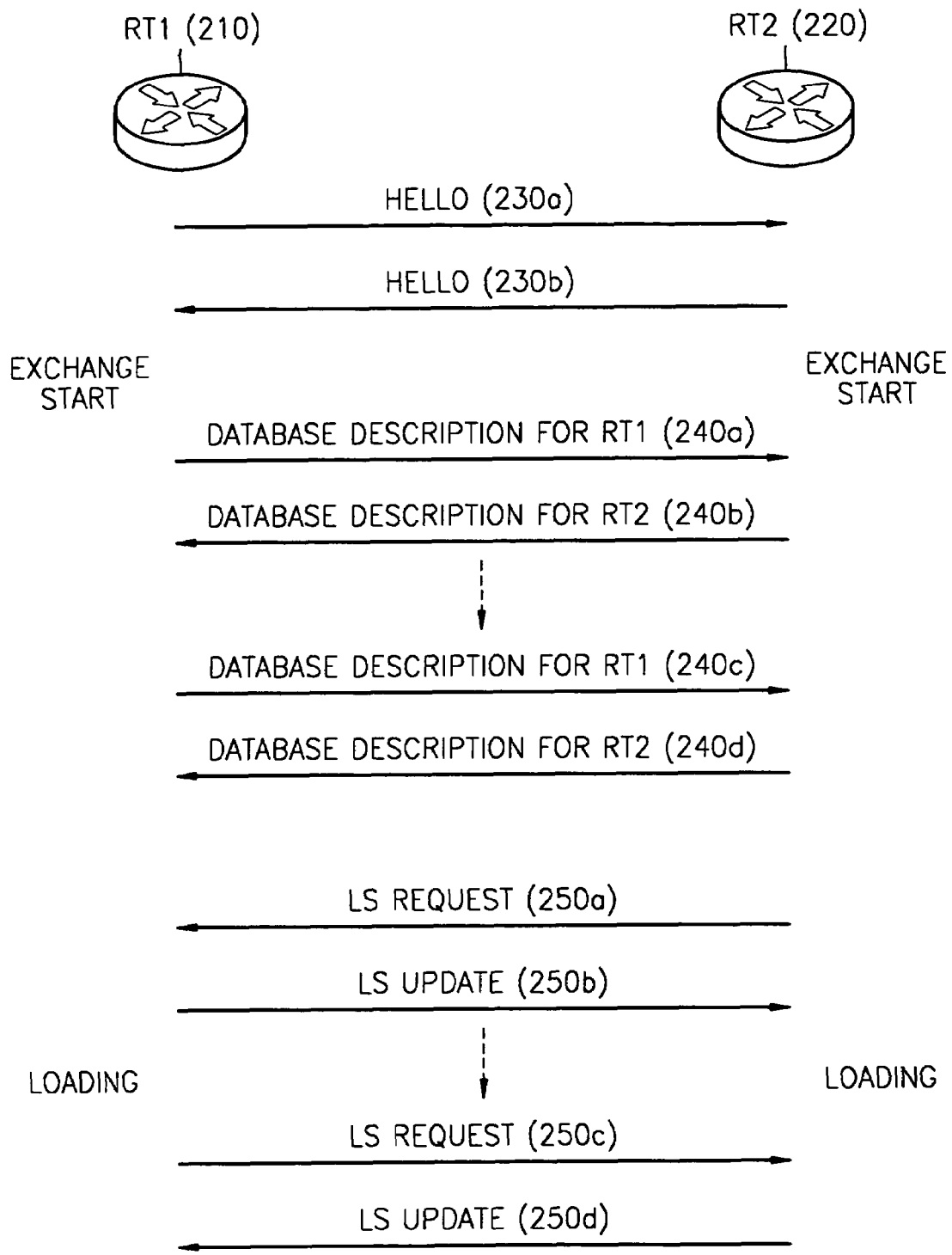
FIG. 2 is a flow diagram of a procedure in which a first open shortest path first router RT1 210 and a second open shortest path first router RT2 220 exchange link state databases with each other.

FIG. 2 is a flow diagram of a procedure in which a first open shortest path first (OSPF) router RT1 210 and a second OSPF router RT2 220 exchange link state databases with each other. The first OSPF router 210 and the second OSPF router 220 use OSPF packets for communication therebetween. The OSPF packets are transmitted in a state of being encapsulated in an Internet protocol (IP) packet. A header format of the OSPF packet will be explained later with reference to FIG. 8. The OSPF packets include hello packets 230a-230n which search for neighboring routers and maintain a relationship with the neighboring routers, database description packets 240a-240n for synchronization of link state databases, link state (LS) packets 250a-250n, such as LS request packets, LS update packets, LS acknowledgement packets, and so on.

Typically, the first OSPF router RT1 210 and the second OSPF router RT2 220 exchange the OSPF packets, namely, hello packets 230a and 230b to prepare for the exchange of link state databases. Next, the first OSPF router RT1 210 transmits brief information on link state advertisements (LSAs) of routers connected thereto to the second OSPF router RT2 220. The LSAs brief information is a database description packet 240a, which, typically, comprises only headers of the LSAs that the routers have. The second OSPF router RT2 220 transmits brief information 240b on LSAs of routers connected thereto. Such LSAs brief information 240c and 240d and so on is exchanged between the first OSPF router RT1 210 and the second OSPF router RT2 220 at a constant time interval.

If a link state of the routers connected to the first OSPF router RT1 210 is changed, the second OSPF router RT2 220 recognizes that the aforesaid brief information on the link state of the routers connected to the first OSPF router RT1 210 is changed, and the second OSPF router RT2 220 requests the first OSPF router RT1 210 to provide detailed information on the changed link state. The detailed information on the changed link state is a link state (LS) request packet 250a. The first OSPF router RT1 210 transmits an LS update packet 250b to the second OSPF router RT2 220. If a link state of the routers connected to the second OSPF router RT2 220 is changed, the first OSPF router RT1 210 requests the second OSPF router RT2 220 to provide detailed information 250c on the changed link state. The second OSPF router RT2 220 transmits an LS update packet 250d to the first OSPF router RT1 210.

FIG. 3 is a diagram showing that a group of routers interconnected by data links is viewed as a group of nodes interconnected by adjacencies. Referring to FIG. 3, networks connected by various network topologies, such as a token ring network, an Ethernet, and a serial network, can be viewed as a group of routers connected by adjacencies. Here, an adjacency is formed such that link state databases can be exchanged through an exchange of hello packets as described in FIG. 2.

Figure 4:
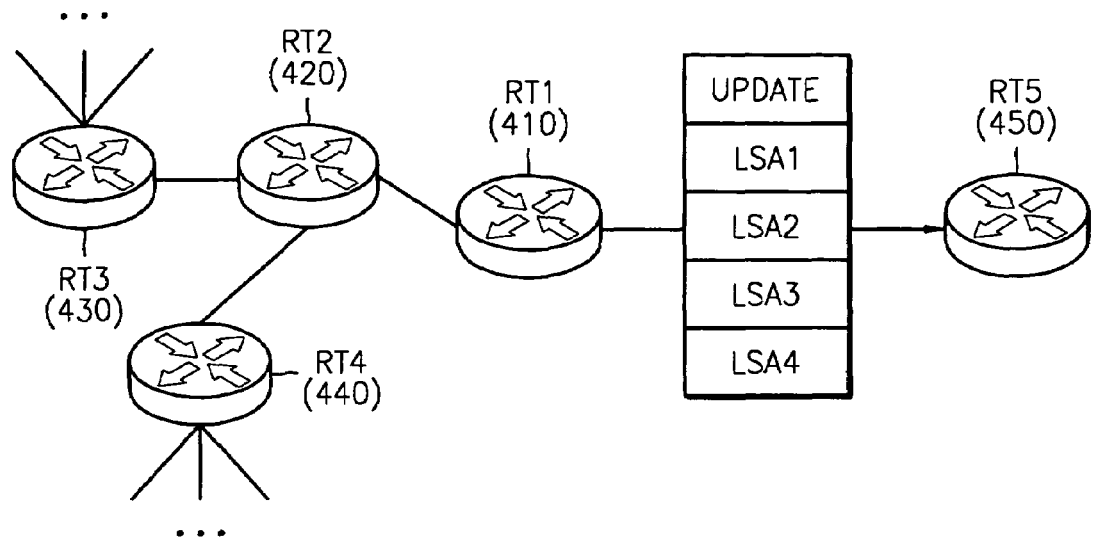
FIG. 4 is a diagram showing that link state advertisements are sent to routers having adjacencies therebetween.

FIG. 4 is a diagram showing that LSAs are sent to routers having adjacencies therebetween. For example, link state information of a first router RT1 410 is LSA1, link state information of a second router RT2 420 is LSA2, link state information of a third router RT3 430 is LSA3, and link state information of a fourth router RT4 440 is LSA4. Link state information is changed when hosts connected to the routers are added or deleted. Thus, the changed link state information should be informed to a fifth adjacent router RT5 450. When all LSA information of the routers 410 through 440 is changed, LSA1 through LSA4 packets are transmitted along with a link state update packet to the fifth router RT5, 450 as shown in FIG. 4.

Figure 5A:
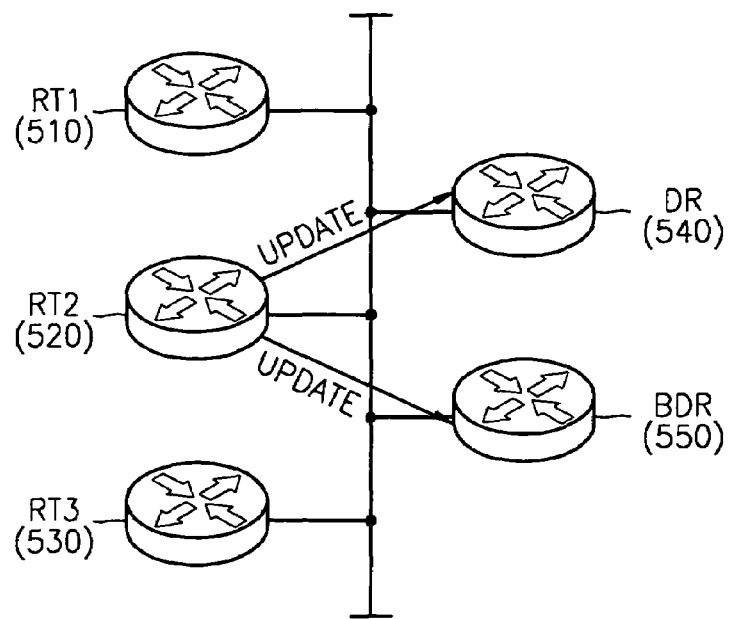
FIGS. 5A through 5C are diagrams for explaining flooding in which a link state update described with reference to FIG. 4 is performed.
Figure 5B:
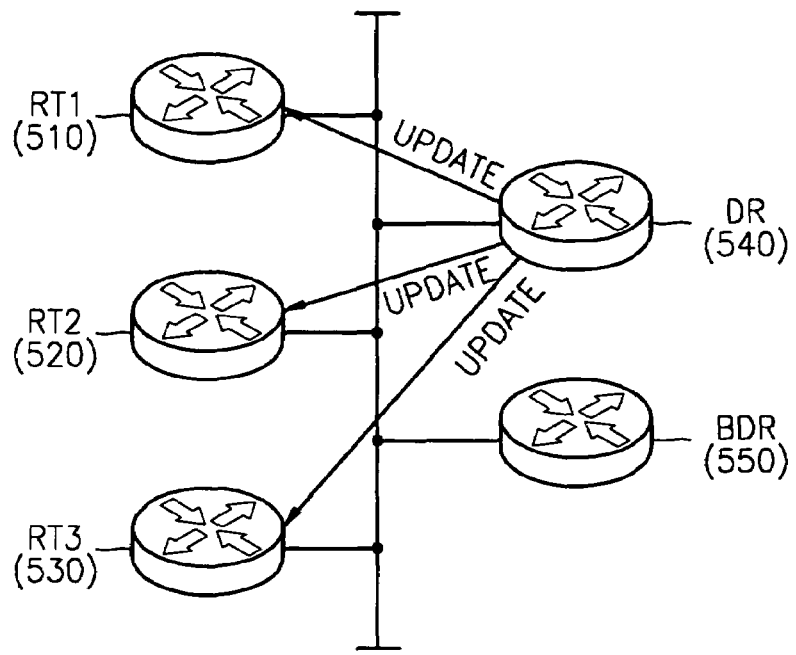
Figure 5C:
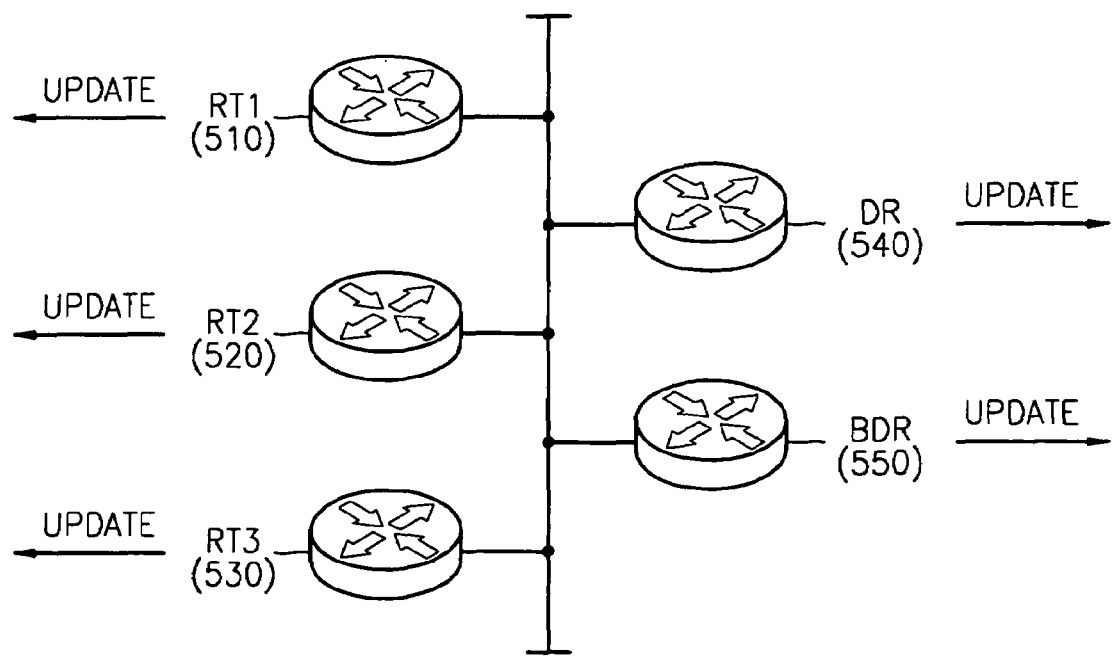

FIGS. 5A through 5C are diagrams for explaining flooding in which a link state update described with reference to FIG. 4 is performed. Referring to FIG. 5A, when a link state of a router, for example, a second router RT2 520 is changed, in order to transmit the changed LSA to all routers, a link state update packet is respectively transmitted to a DR 540 and a backup designated router (BDR) 550. As shown in FIG. 5B, the DR 540 retransmits the link state update packet to the other routers RT1 510 through RT3 530. Next, as shown in FIG. 5C, the routers RT1 510 through RT3 530, the DR 540, and the BDR 550 respectively transmit the link state update packet to neighboring routers. Such a procedure is referred to as flooding. Hence, all the routers have the changed LSA through this flooding procedure.

Figure 6:
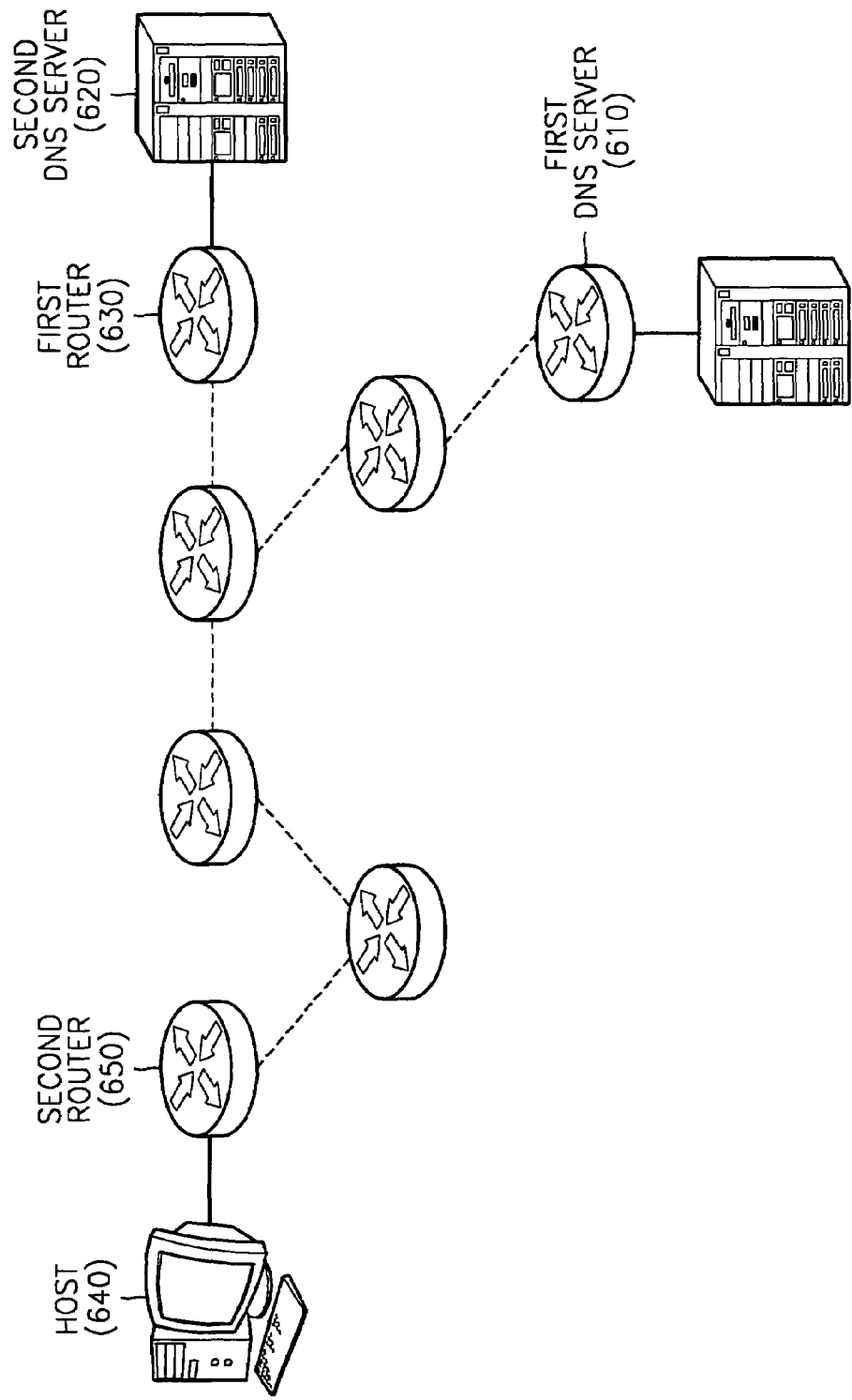
FIG. 6 is a diagram illustrating an interconnection among domain name service (DNS) servers, routers, and a host.

FIG. 6 is a diagram illustrating interconnection among domain name service (DNS) servers, routers, and a host. Referring to FIG. 6, when a first DNS server 610 and a second DNS server 620 exist, a first router 630 connected to the second DNS server 620 should know the address information of the second DNS server 620 to reply to a DNS address request from a second router 650 connected to a host 640. As shown in FIG. 6, when the first DNS server 610 and the second DNS server 620 exist, one of the two DNS servers can be designated as a backup DNS server. Messages transmitted so that the first router 630 can know whether the second DNS server 620 exists will be explained with reference to FIG. 7.

Figure 7:
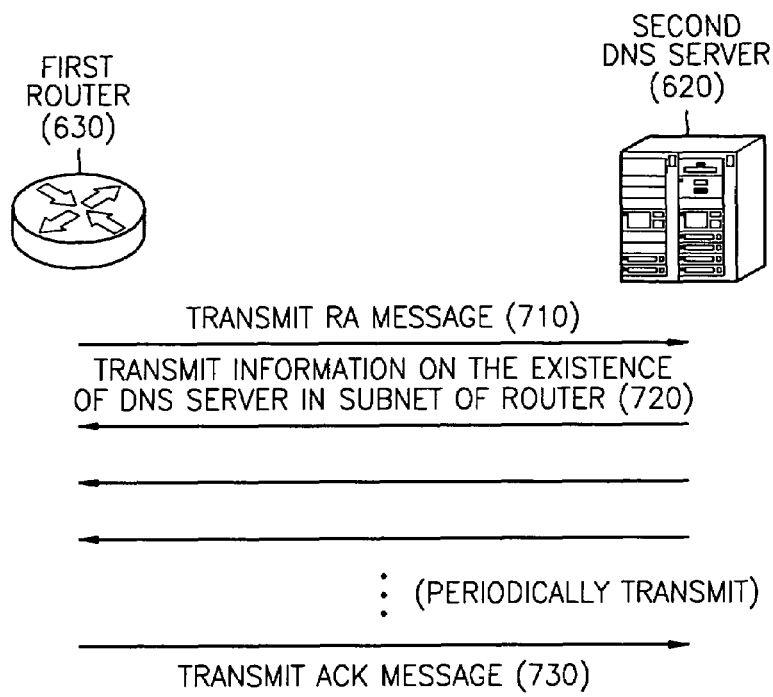
FIG. 7 is a flow diagram of how a router connected to a DNS server knows whether the DNS server exists, according to an embodiment of the present invention.

FIG. 7 is a flow diagram of how a router connected to a DNS server knows whether the DNS server exists. The first router 630 transmits an RA message 710 to its own subnet. The second DNS server 620 transmits to the first router 630 information 720 on the existence of itself as the DNS server 620 in the subnet of the first router 630. The information 720 is periodically transmitted until an acknowledgement message 730 is received from the first router 630. The RA message structure communicated between a router and a DNS server in the router subnet, according to an embodiment of the present invention, will be described in more detail further below with reference to FIG. 11.

Figure 8:
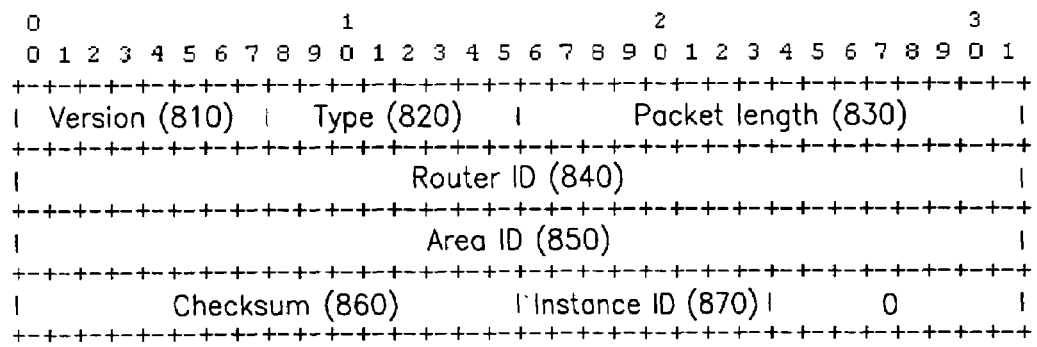
FIG. 8 is a diagram of an open shortest path first packet header.

FIG. 8 is a diagram illustrating an OSPF packet header. The OSPF packet header contains a version field 810, a type field 820, a packet length field 830, a router identification (ID) field 840, an area ID field 850, a checksum field 860, and an instance ID field 870. Typically, the number 3 is used as a version number on an IPv6 network. The type field 820 represents a type of OSPF packet. For example, type 1 represents a hello packet, type 2 represents a database description packet, type 3 represents a link state request packet, type 4 represents a link state update packet, and type 5 represents a link state acknowledgement packet (see FIG. 2). The packet length field 830 signifies the length of the overall OSPF packet. The router ID field 840 signifies an ID of a router from which a packet originates. The area ID field 850 signifies an ID of an autonomous system (AS) to which the router of the packet's source belongs.

FIG. 9 is a diagram of an LSA message format for informing that a DNS server exists in a subnet of a router, according to an embodiment of the present invention. When a D field 910 is set to 1 in the message format shown in FIG. 9, a DNS server exists in a subnet of a router. According to an aspect of the invention, the information 720 about the DNS server that exists in the subnet of the router, as described with reference to FIG. 7, may be transmitted along with setting the D field 910 to 1 in an LSA message. Typically, a router subnet DNS server existence flag is set in a link state information of a particular router having a DNS server in the particular router subnet and the link state information is advertised in an LSA message of the particular router to other routers, thereby informing other routers that the DNS server exists in the subnet of that particular router and that other routers can request from the particular router (as described in more detail below) the DNS server address information. Other fields are explained in RFC 2740 (OSPF for IPv6), and accordingly, will not be explained.

Figure 10:
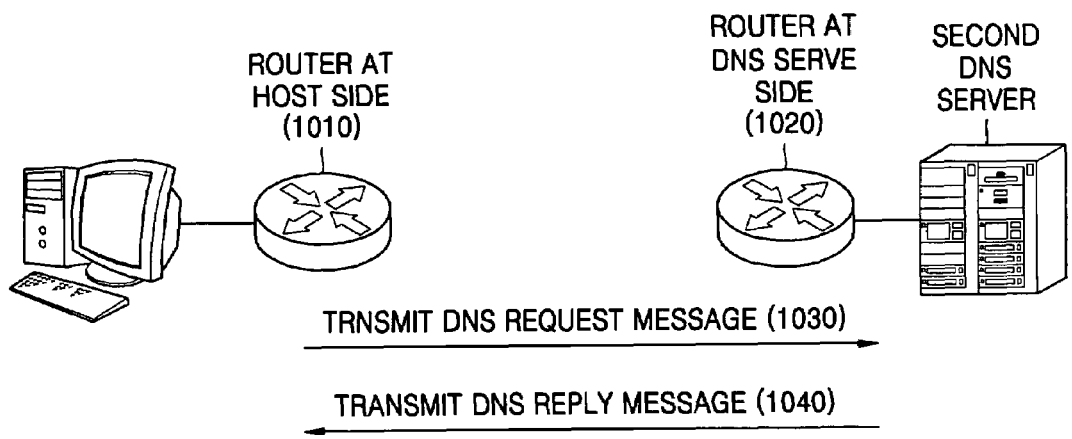
FIG. 10 is a flow diagram of how a router at a host side requests a router at a DNS side to provide an IP address of a DNS server, according to an embodiment of the present invention.

FIG. 10 is a flow diagram of how a router at a host side requests a router at a DNS server side to provide an IP address of a DNS server, according to an embodiment of the present invention. A router 1010 at a host side transmits a DNS request message 1030 to a router 1020 at a DNS server side. The router 1020 at the DNS server side transmits a DNS reply message 1040 in response to the DNS request message. Here, for example, an Internet control message protocol (ICMP) can be used for the DNS request and reply between the host router and the DNS router.

Figure 11:
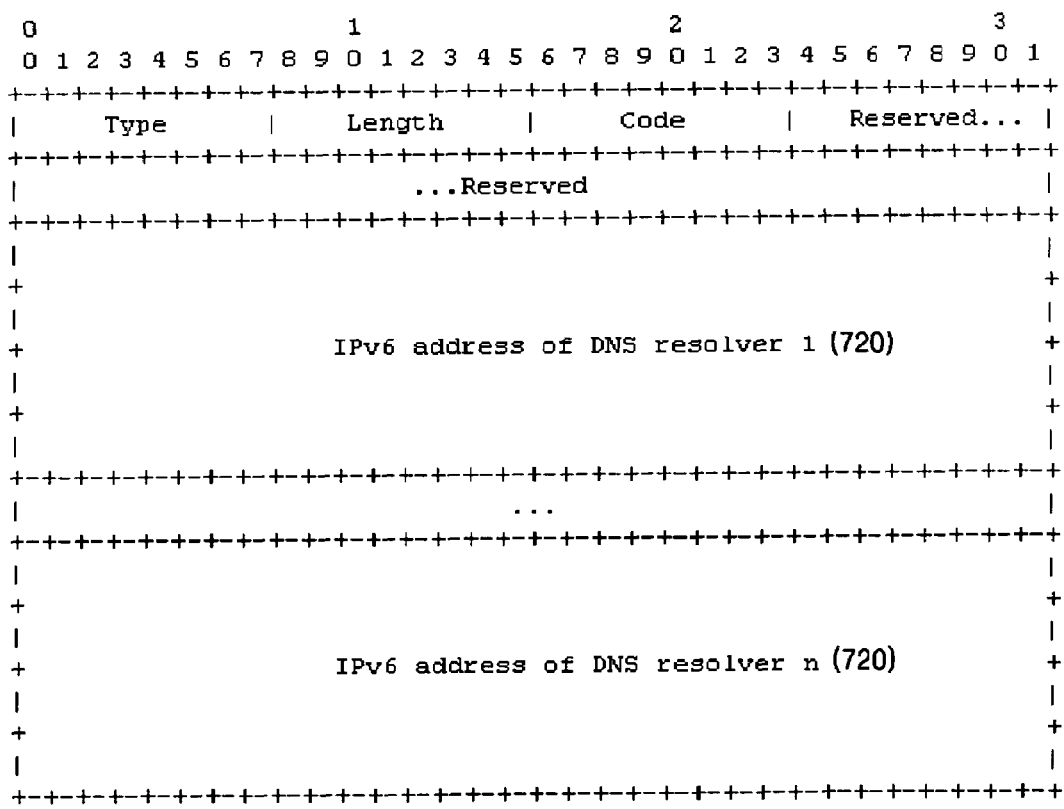
FIG. 11 is a diagram of a DNS server option field contained in a router advertisement (RA) message between a router and a DNS server in a subnet of the router, according to an embodiment of the present invention.

FIG. 11 is a diagram of a DNS server option field contained in an RA message between a router and a DNS server in a subnet of the router, according to an embodiment of the present invention. As also described above with reference to FIG. 7, information 720 on a plurality of DNS servers 1-n can be contained in an RA message from a DNS server to a router in a subnet. The RA message is configured such that a DNS server with high priority is first positioned in the RA message. When the DNS server having the first priority has failed, address information of the DNS server is deleted and address information of a DNS server with the second priority is ranked as the first. A router having received the address information of the router subnet DNS servers stores the DNS server information or broadcasts the RA message to other hosts or subnets.

In sum, according to the present invention, to search for exact positions of DNS servers present in various places of a network, a routing method is used. The present invention uses an OSPF routing protocol, which is one of the most widely used interior gateway protocols (IGPs), to dynamically search for a position of a router which has a DNS server in its own subnet by storing information on the subnet router of the DNS server in an LSA. Then, the LSA information is transmitted to all routers within a pertinent AS through a flooding procedure. When the router with the DNS server in its subnet is requested by another router to provide an address of the DNS server, the router replies to the other router having made the request to provide the DNS address, and the other router having received the reply advertises an RA message containing the information on the DNS server to a pertinent subnet.

FIG. 12 is a flow chart of routing DNS server addresses, according to an embodiment of the present invention. More particularly, FIG. 12 is a flow chart of how the location of a DNS server present on a network is searched using a dynamic routing protocol, such as an OSPF protocol. In more detail, at operation 1210, as described above with reference to FIG. 7, a router advertises an RA message to its own subnet. When the DNS server exists in the subnet of the router, the DNS server having received the RA message transmits to the router information 720 that the DNS server exists. Here, the RA message contains information on at least one DNS server, and is configured such that address information of a DNS server with the highest priority is located first. If a DNS server with the first priority has failed, address information of the failed DNS server is deleted from the RA message, and address information of a DNS server with the second highest priority is located first in the RA message. Information 720 on whether the DNS server exists is periodically transmitted until an acknowledgement message is received from the router. Through this procedure, the location of the DNS server is searched by network routers.

Next, in operation 1220, link state information containing a set D field 910 of the router having the DNS server in its subnet, is stored in an LSA of the router, and the link state information with the set D field 910 stored in the LSA is transmitted to all routers within an AS to which the router belongs. Here, DNS server existence information of the router is stored by setting a D field of the LSA, as described above with reference to FIGS. 8 and 9.

Next, in operation 1230, when the router having received at operation 1210 the RA message including the DNS server information from the DNS server, is requested to provide an address of the DNS server, the router replies to a router having made the request. The router having received the reply advertises an RA message containing address information of the DNS server to a subnet (i.e., to subnet nodes, such as hosts, network equipment, etc.) to which the router having received the reply belongs. That is to say, at operation 1230, a router at a host side which wants to know address information of the DNS server transmits a DNS request message to a router at a DNS server side, and the router at the DNS server side transmits a DNS reply message containing the information 720 of the DNS server to the router at the host side in response to the DNS request message. Here, the DNS request message and the DNS reply message may be transmitted using, for example, an Internet control Message Protocol (ICMP).

Therefore, the present invention provides a method of advertising an address of a domain name service (DNS) server on a network, for example, an IPv6 network, by searching for a location of the DNS server on the network using a predetermined dynamic routing protocol, for example, the OSPF IGP. More particularly, a router uses a node discovery process to locate DNS servers in the subnet of the router and according to the OSPF IGP, the router stores link state information of the router, which indicates existence of any located DNS servers in the subnet to which the router belongs, in a link state advertisement of the router. The link state advertisement containing information about existence of the router subnet DNS server is delivered/transmitted to all other routers within an autonomous system to which the router belongs, for example, through a flooding procedure. Accordingly, the other routers using the contained link state advertisement DNS existence information can request address information of any located DNS servers from the subnet router(s) of the located DNS servers according a protocol, such as the ICMP.

As described above, information on a DNS server can be transmitted to all routers present within an AS. When a router having information on the DNS server is requested to provide an address of the DNS server, the router replies to a requesting router. Thus, the present invention has an advantage in that it can set a network without the necessity of manually setting addresses of DNS servers at hosts. Furthermore, when one DNS server has failed, address information of a backup DNS server can be obtained using an RA message, thereby ensuring the stability of a network. Accordingly, the present invention provides a method comprising automatically setting a domain name service (DNS) server address of a node by searching the domain name service server on a network using node discovery processes of routers and a predetermined dynamic routing protocol used by the routers.

The above-described processes of the present invention may be implemented in software and/or computing hardware. For example, the present invention may be embodied in a general purpose digital computer by running a program from a computer readable medium, including but not limited to storage media such as magnetic storage media (e.g., ROM's, floppy disks, hard disks, etc.) and optically readable media (e.g., CD-ROMs, DVDs, etc.). The computer readable recording medium can be dispersively installed in a computer system connected to a network, and stored and executed as a computer readable code by a distributed computing environment.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A routing method, comprising:
    storing, according to a predetermined dynamic routing protocol, link state information of a router, which has a domain name service server in a network subnet to which the router belongs, in a link state advertisement of the router;
    delivering the link state information of the router having the domain name service server in the router subnet, and stored in the link state advertisement, to all routers within an autonomous system to which the router belongs, through a flooding procedure of the predetermined dynamic routing protocol;
    when the router having the domain name service server in the router subnet is requested by a requesting router to provide an address of the domain name service server, replying to the requesting router by the router having the domain name service server in the router subnet, the address of the domain name service server in the router subnet; and
    advertising by the requesting router having received the reply, a router advertisement message containing the address of the domain name service server to a subnet to which the requesting router having received the reply belongs,
    thereby searching a location of the domain name service server on the network using the predetermined dynamic routing protocol.

2. The routing method of claim 1, wherein the predetermined dynamic routing protocol is an open shortest path first dynamic routing protocol.

3. The routing method of claim 1, further comprising:
    advertising by the router a router advertisement message to its own subnet;
    transmitting to the router by the domain name service server existing in the subnet of the router, information that the domain name service server exists in the router subnet; and
    periodically transmitting the information that the domain name service server exists in the router subnet until the domain name service server receives an acknowledgement message from the router.

4. The routing method of claim 3, further comprising:
    including in the information that the domain name service server exists in the router subnet, information on a plurality of domain name service servers; and
    locating first in the information that the domain name service server exists in the router subnet, address information of one of the plurality of domain name service servers with a highest priority.

5. The routing method of claim 4, wherein when the one domain name service server with the highest priority has failed, the method further comprises:
    deleting address information of the failed domain name service server; and
    changing address information of another of the plurality of domain name service servers from a second highest priority to the highest priority.

6. The method of claim 3, wherein the advertising comprises performing a node discovery process by the router.

7. The routing method of claim 1, wherein the storing of the link state information comprises setting a D field of the link state advertisement to indicate the existence of the domain name service server in the network subnet to which the router belongs.

8. The routing method of claim 1, wherein the router is on the domain name service server side and the requesting router is on a host side, and the method further comprises:
    transmitting by the requesting router a domain name service request message to the router at the domain name service server side; and
    the replying by the router on the domain name service server comprises transmitting a domain name service reply message to the requesting router at the host side, in response to the domain name service request message.

9. The routing method of claim 8, wherein the domain name service request message is transmitted using an Internet control message protocol.

10. The routing method of claim 8, wherein the domain name service reply message is transmitted using the Internet control message protocol.

11. A method of advertising information on a domain name service server, the method comprising:
    storing, according to a predetermined dynamic routing protocol, link state information of a router, which has a domain name service server in a network subnet to which the router belongs, in a link state advertisement of the router; and transmitting the link state information of the router having the domain name service server in the router subnet, and stored in the link state advertisement, to all routers within an autonomous system to which the router belongs, through a flooding procedure of the predetermined dynamic routing protocol, wherein all of the routers within the autonomous system transmit router advertisement (RA) messages including the link state information of the DNS server to predetermined hosts which ask for a location of the DNS server, thereby automatically setting an address of the DNS server on the predetermined hosts.

12. The method of claim 11, wherein the predetermined dynamic routing protocol is an open shortest path first dynamic routing protocol.

13. A computer-readable recording medium having thereon a program for executing a routing method, the method comprising:

storing, according to a predetermined dynamic routing protocol, link state information of a router, which has a domain name service server in a network subnet to which the router belongs, in a link state advertisement of the router;

transmitting the link state information of the router having the domain name service server in the router subnet, and stored in the link state advertisement, to all routers within an autonomous system to which the router belongs, through a flooding procedure of the predetermined dynamic routing protocol;

when the router having the domain name service server in the router subnet is requested by a requesting router to provide an address of the domain name service server, replying to the requesting router by the router having the domain name service server in the router subnet, the address of the domain name service server in the router subnet; and advertising by the requesting router having received the reply, a router advertisement message containing the address of the domain name service server to a subnet to which the requesting router having received the reply belongs, thereby searching a location of the domain name service server on the network using the predetermined dynamic routing protocol.

14. A computer-readable recording medium having thereon a program for executing a method of advertising information on a domain name service server, the method comprising:

storing, according to a predetermined dynamic routing protocol, link state information of a router, which has a domain name service server in a network subnet to which the router belongs, in a link state advertisement of the router; and transmitting the link state information of the router having the domain name service server in the router subnet, and stored in the link state advertisement, to all routers within an autonomous system to which the router belongs, through a flooding procedure of the predetermined dynamic routing protocol, wherein all of the routers within the autonomous system transmit router advertisement (RA) messages including the link state information of the DNS server to predetermined hosts which ask for a location of the DNS server, thereby automatically setting an address of the DNS server on the predetermined hosts.

15. A method, comprising:

automatically setting a domain name service (DNS) server address of a node by searching the DNS server on a network using a node discovery process of a DNS server side router and a predetermined dynamic routing protocol of the DNS server side router, the server side router transmitting a link state advertisement (LSA) including a location of the DNS server to all routers within an autonomous system to which the DNS server side router belongs, and replying to a request for a DNS address from a requesting router, wherein the requesting router, having received the reply, advertises a router advertisement (RA) message containing the LSA to a subnet in which the requesting router belongs.

16. A network router, comprising:

a programmed computer processor controlling the router according to a process comprising:

advertising according to a node discovery process of the router, a router advertisement message to its own network subnet, receiving from a domain name service server existing in the router subnet, information that the domain name service server exists in the router subnet, storing, according to a predetermined dynamic routing protocol, link state information of the router, which indicates existence of the domain name service server in the router subnet, in a link state advertisement of the router, transmitting the link state information, which indicates the existence of the domain name service server in the router subnet and stored in the link state advertisement, to all routers within an autonomous system to which the router belongs, through a flooding procedure of the predetermined dynamic routing protocol, receiving a request from a requesting router to provide an address of the domain name service server, and replying to the requesting router with the address of the domain name service server in the router subnet.

17. A method of automatically setting a domain name service (DNS) server address of a node using a node discovery process of a DNS server side router and a predetermined dynamic routing protocol of the DNS server side router, the method comprising:

advertising according to a node discovery process of the DNS server side router, a router advertisement (RA) message to a DNS server side subnet;

transmitting to the DNS server side router by a domain name service server existing in the subnet of the DNS server side router, information that the domain name service server exists in the DNS server side router subnet;

setting a DNS flag in a link state advertisement of the DNS server side router as the predetermined dynamic routing protocol;

transmitting the link state advertisement with the set DNS flag to other routers within an autonomous system to which the DNS server side router belongs;

each other router transmitting a DNS request message to the DNS server side router to provide an address of the DNS server existing in the DNS server side router subnet, in response to the DNS server side router link state advertisement with the set DNS flag;

transmitting a DNS reply message by the DNS server side router including the DNS server address to each other router, in response to the DNS request message; and each other router receiving the DNS reply message, advertising, according to each other router node discovery process, the DNS server address to nodes in respective subnets, thereby automatically setting the DNS server address in the nodes.

18. The method of claim 17, further comprising:

providing an option field in the RA message; and storing according to a priority a plurality of DNS servers information in the option field, thereby providing backup DNS server information to the DNS server side router in case of a DNS server failure.

* * * * *